(12) United States Patent
Leung et al.

(10) Patent No.: US 9,679,128 B1
(45) Date of Patent: Jun. 13, 2017

(54) DE-AUTHENTICATION OF WEARABLE DEVICES

(71) Applicant: Amazon Technologies, Inc., Seattle, WA (US)

(72) Inventors: Omar Sze Leung, Palo Alto, CA (US); Jung Sik Yang, Cupertino, CA (US); Kenneth Lawrence Staton, San Carlos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 14/492,820

(22) Filed: Sep. 22, 2014

(51) Int. Cl.
    *G06F 21/00* (2013.01)
    *G06F 21/44* (2013.01)
    *G06F 21/34* (2013.01)

(52) U.S. Cl.
    CPC .............. *G06F 21/44* (2013.01); *G06F 21/34* (2013.01)

(58) Field of Classification Search
    CPC ........ G06F 21/32; G06F 21/30; G06F 3/0488; G06F 1/163; H04L 63/0853
    USPC .......................................................... 726/16
    See application file for complete search history.

(56) References Cited

U.S. PATENT DOCUMENTS

| | | | | |
|---|---|---|---|---|
| 5,521,497 | A * | 5/1996 | Schneider | G01B 7/14 267/64.19 |
| 6,237,739 | B1 * | 5/2001 | Mazur | G07D 7/00 194/207 |
| 2002/0097059 | A1 * | 7/2002 | Tartagni | G01B 7/004 324/687 |
| 2002/0142163 | A1 * | 10/2002 | Mino | B05D 1/185 428/403 |
| 2005/0156587 | A1 * | 7/2005 | Yakymyshyn | G01R 15/207 324/117 R |
| 2007/0245748 | A1 * | 10/2007 | Binks | F25D 3/10 62/45.1 |
| 2010/0005294 | A1 * | 1/2010 | Kostiainen | H04B 10/1143 713/168 |
| 2014/0007227 | A1 * | 1/2014 | Morinaga | G06F 21/31 726/19 |
| 2014/0266624 | A1 * | 9/2014 | Van Bosch | G06K 7/087 340/10.1 |
| 2015/0186628 | A1 * | 7/2015 | Bush | G06F 21/31 726/19 |

* cited by examiner

*Primary Examiner* — Syed Zaidi

(74) *Attorney, Agent, or Firm* — Lee & Hayes, PLLC

(57) ABSTRACT

A wearable device comprises a first member, a second member that is configured to move relative to the first member, a sensor disposed on the first member, one or more components disposed on the second member, and an authentication module. The sensor is configured to output a sense signal that is indicative of a distance between the sensor and at least one of the one or more components. When the wearable device is worn by a user, the wearable device may be authenticated. The sense signal indicates when at least a portion of the wearable device is opened and/or removed. The wearable device may be de-authenticated based at least in part on the sense signal indicating that a portion of the wearable device has been opened or removed.

11 Claims, 9 Drawing Sheets

DE-AUTHENTICATION OF WEARABLE DEVICES

BACKGROUND

A wearable device may be worn by a user. It may be desirable to authenticate such a wearable device, while an authorized user wears the device. Such authentication may be useful, for example, to positively identify that the user wearing the wearable device is an authorized user, while providing a service to the user. It may also be desirable to selectively de-authenticate the wearable device, to deter misuse of the wearable device by unauthorized users.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes de-authenticating a wearable device, when, for example, at least a portion of the wearable device is opened or removed (e.g., while the user removes the wearable device from his or her body), to deter misuse of the wearable device by an unauthorized user. The wearable device may remain authenticated as long as the wearable device is worn by an authorized user, and the wearable device is in a closed state.

A wearable device may comprise a first member, which, for example, may be a strap. The wearable device may further comprise a second member, which, for example, may be a latch that is attached to the first member (e.g., via a hinge). The second member may be configured to move relative to the first member. For example, when the wearable device is worn by a user, the first member may be attached to the second member. In some examples, a sensor may be disposed on the first member, and a magnet may be disposed on the second member (although, in some examples, instead of a single magnet, an array of magnets may be disposed). In some examples, the sensor may be a magnetic field sensor, e.g., a Hall effect sensor. The sensor may sense a magnetic field generated by the magnet.

When the wearable device is worn by an authorized user, the user may authenticate the wearable device (in some examples, the user may authenticate the wearable device only while wearing the wearable device). Also, when the wearable device is worn by the user, the first member may be attached to the second member. Accordingly, a distance between the magnet and the sensor may be relatively less, and hence, the sensor may sense a relatively strong magnetic field. An authentication module of the wearable device may continue keeping the wearable device authenticated, as long as the sensor senses the strong magnetic field.

However, when the user opens at least a part of the wearable device (e.g., while removing the wearable device from his or her body), at least a part of the first member may move away from the second member. Accordingly, a distance between the magnet and the sensor may become relatively more, and hence, the sensor may sense a relatively weak magnetic field. When the authentication module detects this change in the sensed magnetic field, the authentication module may assume that the user has removed the wearable device from his or her body. Accordingly, the authentication module may de-authenticate the wearable device, thereby deterring misuse of the wearable device by an unauthorized user.

Illustrative Device

Figure 1:
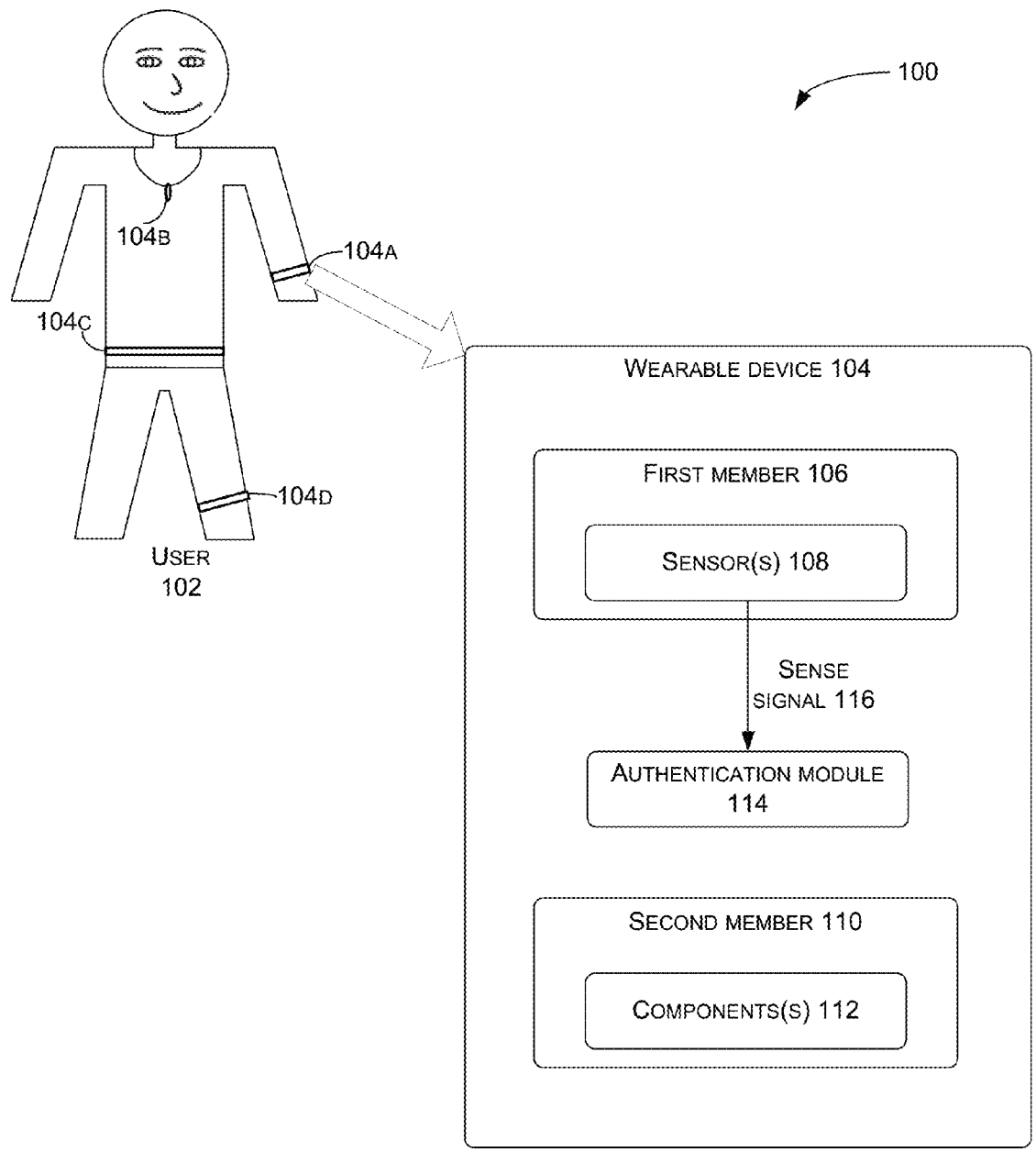
FIG. 1 is an illustrative system for selectively authenticating or de-authenticating a wearable device that is configured to be worn by a user.

FIG. 1 is an illustrative system 100 for selectively authenticating or de-authenticating a wearable device that is configured to be worn by a user. A user 102 may wear one or more wearable devices 104, e.g., wearable devices 104a, 104b, 104c and 104d. The wearable devices 104 may be implemented in various physical form factors including, for example, hats, headbands, hair clips, earrings, necklaces, pendants, brooches, armlets, brassards, bracelets, wristbands, belts, anklets, and/or the like. In this illustration, wearable devices 104a, 104b, 104c and 104d are respectively depicted as a wristband or bracelet, a pendant, a belt, and an anklet. Although not illustrated in FIG. 1, the wearable devices 104 may communicate with one or more external computing devices (e.g., a point-of-sale system, a financial transaction terminal, building control system, or other computing devices), e.g., to provide a service to the user 102.

In some examples, the wearable device 104 may comprise a first member 106, one or more sensors 108 coupled to or embedded in the first member 106, a second member 110, one or more components 112 coupled to or embedded in the second member 110, and an authentication module 114. Although not illustrated in FIG. 1 for purposes of illustrative clarity, the wearable device 104 may include several other elements, e.g., a processing core, a memory, a communication interface, a display, and/or the like.

In some examples, the second member 110 may move relative to the first member 106 (e.g., rotatable and/or separable). When the user 102 wears the wearable device 104, the first member 106 and the second member 110 may be proximally located (e.g., physically attached to each other). However, if the user 102 removes the wearable device 104, at least a part of the first member 106 may move away or be separated from the second member 110. In some examples, if the wearable device 104 is a wristband, one of the first member 106 and the second member 110 may be a strap of the wristband, while another of the first member 106 and the second member 110 may be a latch of the wristband. While the user 102 wears the wristband, the strap and the latch are proximally located (e.g., the strap and the latch are physically attached to each other). However, once the user 102 removes the wristband, at least a portion of the strap and the latch are separated.

When the user 102 wears the wearable device 104, a distance between the sensor 108 (which is disposed on the first member 106) and the component 112 (which is disposed on the second member 110) is relatively less, as the first member 106 and the second member 110 are proximally located. On the other hand, when the user 102 removes the wearable device 104, the distance between the sensor 108 and the component 112 increases, as the first member 106 moves away or is separated from the second member 110. In some examples, the sensor 108 may be configured to output a sense signal 116 that is indicative of the distance between the component 112 and the sensor 108. Thus, while the user 102 wears the wearable device 104, the sense signal 116 may indicate that the distance between the sensor 108 and the component 112 is relatively less (e.g., less than a threshold value). On the other hand, while the user 102 removes the wearable device 104, the sense signal 116 may indicate that the distance between the sensor 108 and the component 112 is relatively more (e.g., higher than the threshold value).

The authentication module 114 may be configured to, in response to the sense signal 116 being indicative of the component 112 being more than a threshold distance from the sensor 108, de-authenticate the wearable device 104. Thus, for example, after the user 102 wears the wearable device 104, the user 102 may authenticate the wearable device 104, e.g., by entering a password in the wearable device 104, by providing a finger print of the user 102 in a finger print reader of the wearable device 204, and/or the like. Once the wearable device 104 is authenticated, the wearable device 104 may be used for a variety of purposes. For example, the user 102 may use the authenticated wearable device 104 at a point-of-sale system for a financial transaction.

However, once the user 102 removes a portion of the wearable device 104 and/or opens the wearable device 104 (e.g., removes the wearable device 104 from the hand of the user 102 by separating the first member 106 from the second member 110), based on the sense signal 116 indicating that the component 112 is more than the threshold distance from the sensor 108, the authentication module 114 may automatically de-authenticate the wearable device 104. Thus, removing a portion of the wearable device 104 by the user 102 may result in automatic de-authentication of the wearable device 104. This, for example, may deter misuse of the wearable device 104 by a different user, and the wearable device 104 may remain authenticated as long as the wearable device 104 is worn by the user 102. Once the user 102 removes the wearable device 104 by separating the first member 106 from the second member 110, the de-authenticated wearable device 104 may not be used by another user at the point-of-sale system for any financial transaction (unless the wearable device 104 is re-authenticated).

Figure 2A:
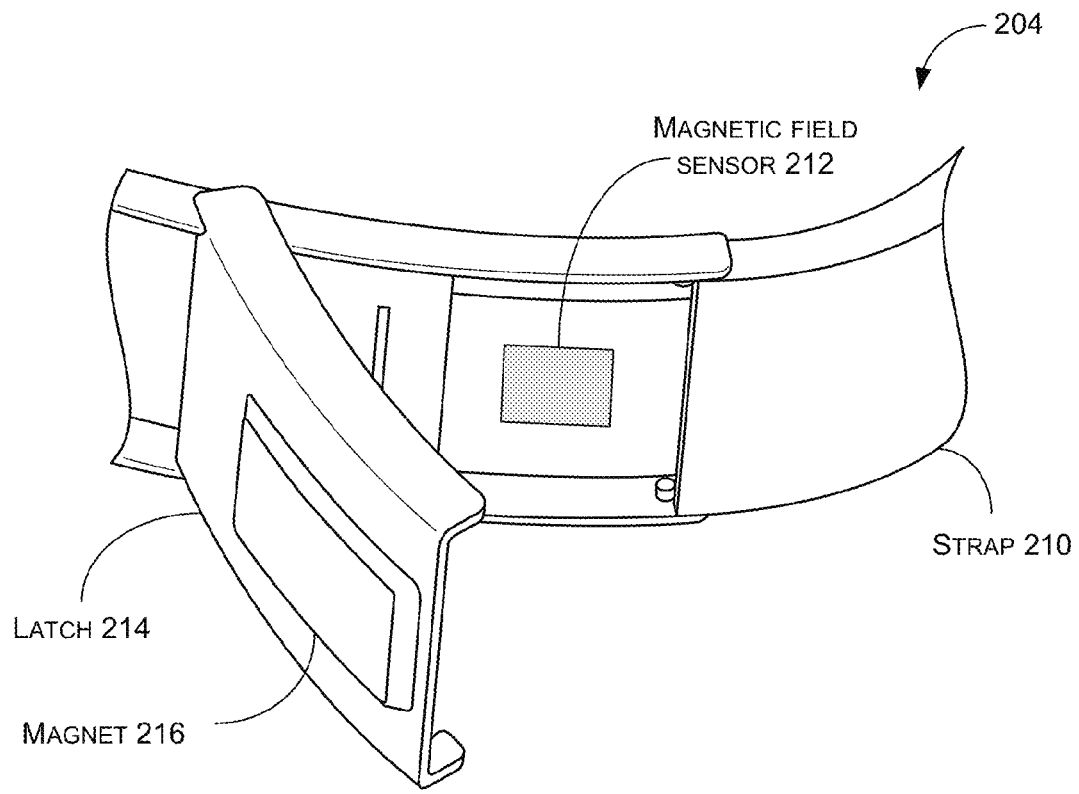
FIGS. 2A and 2B illustrate a portion of an illustrative wearable device.
Figure 2B:
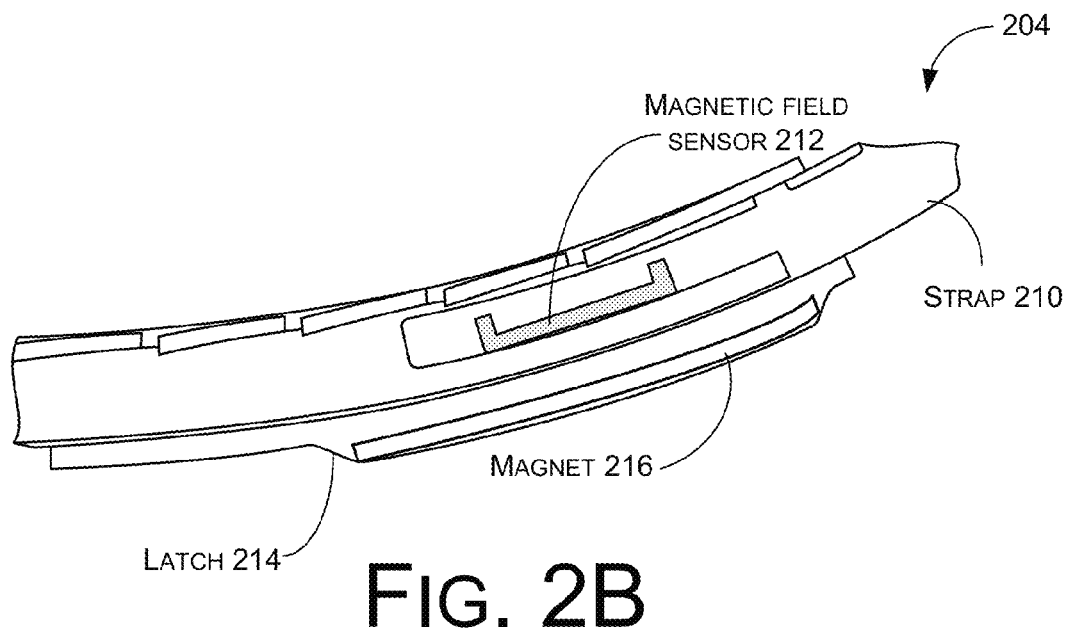

FIGS. 2A and 2B illustrate a portion of an illustrative wearable device 204. Specifically, FIG. 2A illustrates the portion of the wearable device 204 while the wearable device 204 in an open state. The wearable device 204 would typically be in the open state while the wearable device 204 is not worn by a user, and when at least part of the first member and at least part of the second member of the wearable device is separated from each other (or at a higher distance from each other). FIG. 2B illustrates the portion of the wearable device 204 while the wearable device 204 in a closed state, which would typically correspond to the wearable device 204 being worn by the user and when the first member is attached to the second member. The wearable device 204, for example, is a wristband, a bracelet, a belt, an anklet, or the like. The wearable device 204, for example, may be worn by the user 102 of FIG. 1.

Referring to FIGS. 2A and 2B, the wearable device 204 may comprise a strap 210, a magnetic field sensor 212 coupled to the strap 210, a latch 214, and a magnet 216 coupled to the latch 214. The latch 214 may be attached to the wearable device 204 via a hinge (not illustrated in FIGS. 2A and 2B). The strap 210, the magnetic field sensor 212, the latch 214, and the magnet 216 are examples of the first member 106, the sensor 108, the second member 110 and the component 112, respectively, of FIG. 1. In some examples, the magnet 216 may be a permanent magnet. In some other examples, the magnet 216 may be an electro-magnet, which may be powered by a power supply (e.g., a battery) that powers various other elements of the wearable device 204 while the wearable device 204 is switched on. In some examples, if the magnet 216 is an electro-magnet, the magnet 216 may be switched on when the user 102 authenticates the wearable device 204, and may remain switched on at least as long as the wearable device 204 remains authenticated.

In some examples, the magnetic field sensor 212 may sense a magnetic field generated by the magnet 216, and generate an output signal (e.g., the sense signal 116) based on the sensed magnetic field. Any type of magnetic field sensor may be used, such as a Hall effect sensor, although any other appropriate type of magnetic field sensors may also be used, such as a magneto-diode, a magneto-transistor, a magnetometer, a magnetoresistance based sensor, a Lorentz-force-based Microelectromechanical systems (MEMS) sensor, or the like. Although not illustrated in FIGS. 2A and 2B, the magnetic field sensor 212 may be powered using, for example, a battery or a power supply on which the wearable device 204 operates.

As discussed, the wearable device 204 illustrated in FIG. 2A is in the open state, e.g., while the wearable device 204 is not being worn by the user 102, and at least a part of the latch 214 is separated from the strap 210. As illustrated in FIG. 2B, the user 102 may wear the wearable device 204 by securing the latch 214 on the strap 210, e.g., using a clasp mechanism (not illustrated in FIGS. 2A and 2B). The user 102 may wear the wearable device 204 in any appropriate part of the body, e.g., on a hand (e.g., as a bracelet or a wristband), an ankle (e.g., as an anklet), around the waist (e.g., as a belt), around the neck (e.g., as a necklace), or the like.

As illustrated in FIG. 2A, while in the open state, a distance between the magnet 216 and the magnetic field sensor 212 may be relatively high (e.g., higher than a threshold distance), thereby resulting in a relatively low magnetic field (or no or undetectable magnetic field) generated by the magnet 216 over the magnetic field sensor 212. On the other hand, as illustrated in FIG. 2B, while in the closed state (e.g., while the user 102 wears the wearable device 204), the distance between the magnet 216 and the magnetic field sensor 212 may be relatively low (e.g., lower than a threshold distance), due to the latch 214 being secured on the strap 210, thereby resulting in a relatively high magnetic field generated by the magnet 216 over the magnetic field sensor 212. A value of the threshold distance may be based on the actual implementation of the wearable device 204, and dimensions of various elements of the wearable device 204. Merely as an example, the threshold distance may be 5 mm. The magnetic field sensor 212 may sense the magnetic field generated by the magnet 216, and accordingly output the sense signal 116.

Thus, the sense signal 116 may be indicative of a low or zero magnetic field while the wearable device 204 is in the open state, and the sense signal 116 may be indicative of a high magnetic field while the wearable device 204 is in the closed state. Accordingly, the sense signal may also be indicative of a distance between the magnet 216 and the magnetic field sensor 212 (or indicative of whether the wearable device 204 is in the open state or the closed state).

Although not illustrated in FIGS. 2A and 2B, in some examples, the wearable device 204 may comprise the authentication module 114. The authentication module 114 may receive the sense signal 116 from the magnetic field sensor 212, and monitor the strength of the magnetic field sensed by the magnetic field sensor 212 (e.g., thereby also monitoring the distance between the magnet 216 and the magnetic field sensor 212).

After the user 102 wears the wearable device 204, the user 102 may authenticate the wearable device 204 (e.g., by inputting a password in the wearable device 204, by providing a finger print of the user 102 in a finger print reader of the wearable device 204, and/or the like). That is, the user 102 may authenticate the wearable device 204 while the wearable device 204 is in the closed state, the distance between the magnet 216 and the magnetic field sensor 212 is less than the threshold distance, and the magnetic field sensed by the magnetic field sensor 212 is relatively high (e.g., higher than the threshold magnetic field value). As long as the user 102 continues wearing the wearable device 204, the distance between the magnet 216 and the magnetic field sensor 212 may continue to be less than the threshold distance, the magnetic field sensed by the magnetic field sensor 212 may continue to be relatively high, and the wearable device 204 may continue to remain authenticated (unless, for example, the user 102 manually de-authenticates the wearable device 204).

The user may remove the wearable device 204 from his or her body, e.g., by unfastening the clasp that attaches the latch 214 to the strap 210, and moving the latch 214 away from the strap 210. This may increase the distance between the magnet 216 and the magnetic field sensor 212 (e.g., the distance between the magnet 216 and the magnetic field sensor 212 may become higher than the threshold distance), and accordingly, may decrease the magnetic field as sensed by the magnetic field sensor 212. The authentication module 114 may sense the decreases in the sensed magnetic field (i.e., senses the increase in the distance), and may automatically de-authenticate the wearable device 204. That is, the wearable device 204 may be automatically de-authenticated whenever the user 102 removes the wearable device 204 from his or her body (or whenever the latch 214 is not attached to the strap 210), thereby deterring misuse of the wearable device 204 by an unauthorized user.

In FIG. 2A, the magnet 216 is illustrated to be coupled to an outer surface of the latch 214 (i.e., the surface of the latch 214 that does not face the magnetic field sensor 212, while the wearable device 204 is in the closed state). However, in some examples and although not illustrated in FIG. 2A, the magnet 216 may be coupled to an inner surface of the latch 214 (i.e., the surface of the latch 214 that faces the magnetic field sensor 212 while the wearable device 204 is in the closed state), or may be embedded within the latch 214 (e.g., as illustrated in FIG. 2B).

In some examples, the magnetic field sensor 212 and/or the magnet 216 may be shielded from external magnetic fields (e.g., magnetic fields generated by magnets that are external to the wearable device 204). For example, at least a part of the strap 210 and/or the latch 214 may be coated with material that shields the magnetic field sensor 212 and/or the magnet 216 from external magnetic fields. For example, shields made of high magnetic permeability metal alloys may be used, such as sheets of Permalloy and Mu-Metal (e.g., a nickel-iron alloy), or with nanocrystalline grain structure ferromagnetic metal coatings. These materials may draw any external magnetic field into themselves, thereby providing a path for the external magnetic field lines around the shielded magnetic field sensor 212 and/or the magnet 216. Shielding the magnetic field sensor 212 and/or the magnet 216 from external magnetic fields may, for example, protect against use of an external strong magnet to keep the wearable device 204 authenticated, even if the wearable device 204 is at least temporarily in the open state.

In some examples, if the wearable device 204 is exposed to a very strong external magnetic field (e.g., placed within a Magnetic resonance imaging (MRI) machine, or near a very strong external magnet), the magnetic field sensor 212 may sense a strong magnetic field even when the wearable device 204 is in the open state. To prevent such a scenario, an upper magnetic field threshold may be defined. The upper magnetic field threshold may correspond to (or be slightly higher than) the highest possible magnetic field sensed by the magnetic field sensor 212 when the wearable device 204 is in the closed position. When the magnetic field sensed by the magnetic field sensor 212 is higher than the upper magnetic field threshold, the authentication module 114 may de-authenticate the wearable device 204.

In FIG. 2A, the magnet 216 is illustrated to be coupled to the latch 214 and the magnetic field sensor 212 is illustrated to be coupled to the strap 210. However, in some examples and although not illustrated in FIG. 2, the position of the magnet 216 and the magnetic field sensor 212 may be interchanged (i.e., the magnet 216 may be coupled to the strap 210, and the magnetic field sensor 212 may be coupled to the latch 214).

In some examples, the latch 214 may be adjustably coupled to the strap 210. For example, in the wearable device 204 is used as a wristband, based on a diameter of the hand of the user 102, the position on the hand of the user 102 where the wearable device 204 is worn, and/or how tight the wearable device 204 is worn by the user 102, the user 102 may adjust the latch 214 relative to the strap 210. To ensure that the magnetic field generated by the magnet 216 sufficiently covers the magnetic field sensor 212, in some examples, the magnet 216 may be a long and continuous magnet, such that for each possible relative position of latch 214 and the strap 210 (e.g., while the wearable device 204 is in the closed state), at least a part of the magnet 216 may be over the magnetic field sensor 212 (i.e., the magnetic field generated by the magnet 216 may be over the magnetic field sensor 212).

As previously discussed herein, in FIGS. 2A and 2B, a single, long magnet 216 is coupled to the latch 214, such that for each possible relative position of latch 214 and the strap 210, at least a part of the magnet 216 may be over the magnetic field sensor 212 (i.e., the magnetic field generated by the magnet 216 may be over the magnetic field sensor 212). However, instead of a single, long and continuous magnet, a plurality of magnets may be used. For example, FIGS. 3A and 3B illustrate a portion of an illustrative wearable device 304 comprising a plurality of magnets 316a, 316b and 316c.

Similar to FIGS. 2A and 2B, the wearable device 304 may comprise a strap 310, a magnetic field sensor 312 coupled to the strap 310, a latch 314, and the magnets 316a, . . . , 316c coupled to the latch 214. The wearable device 304 may operate at least in part in a manner that is similar to that of the wearable device 204 of FIGS. 2A and 2B. However, in this example, the magnet 216 of the wearable device 204 is replaced by the magnets 316a, . . . , 316c in the wearable device 304.

Having the plurality of magnets 316a, . . . , 316c, for example, may provide that for each relative position of latch 314 and the strap 310 (e.g., based on how tight the user 102 wears the wearable device 304), at least one of the magnets is over or proximate to the magnetic field sensor 312 (i.e., magnetic field generated by at least one of the magnets is over the magnetic field sensor 312). For example, for the relative position of the latch 314 and the strap 310 (e.g., while the wearable device 304 is in the closed state) illustrated in FIG. 3A, the magnet 316b in over the magnetic field sensor 312 (i.e., the magnetic field generated by the magnet 316b is over the magnetic field sensor 312).

Figure 3A:
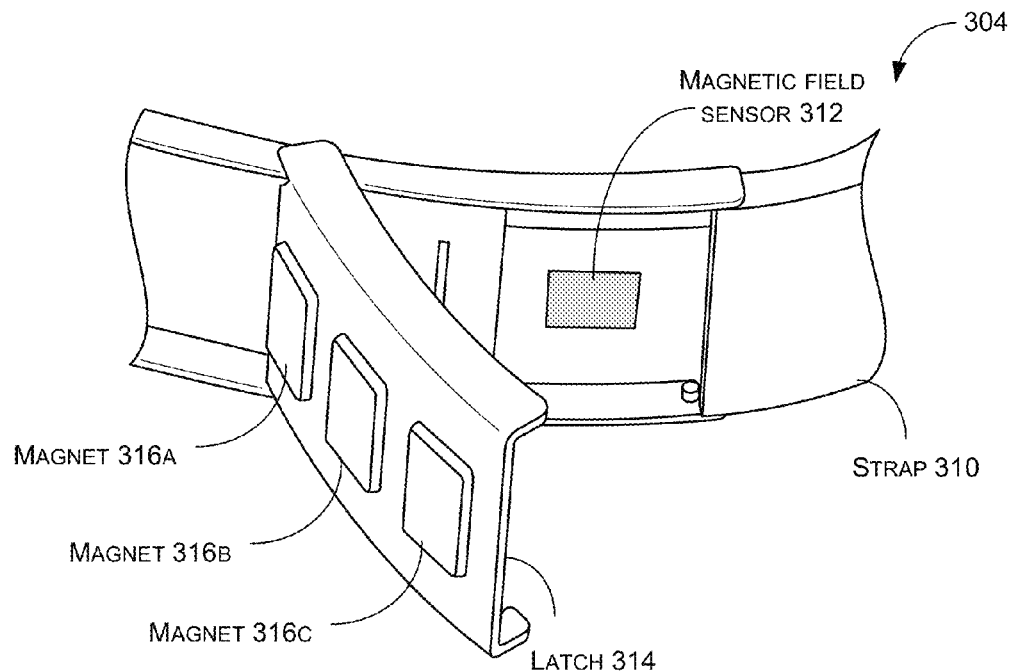
FIGS. 3A and 3B illustrate a portion of another illustrative wearable device.
Figure 3B:
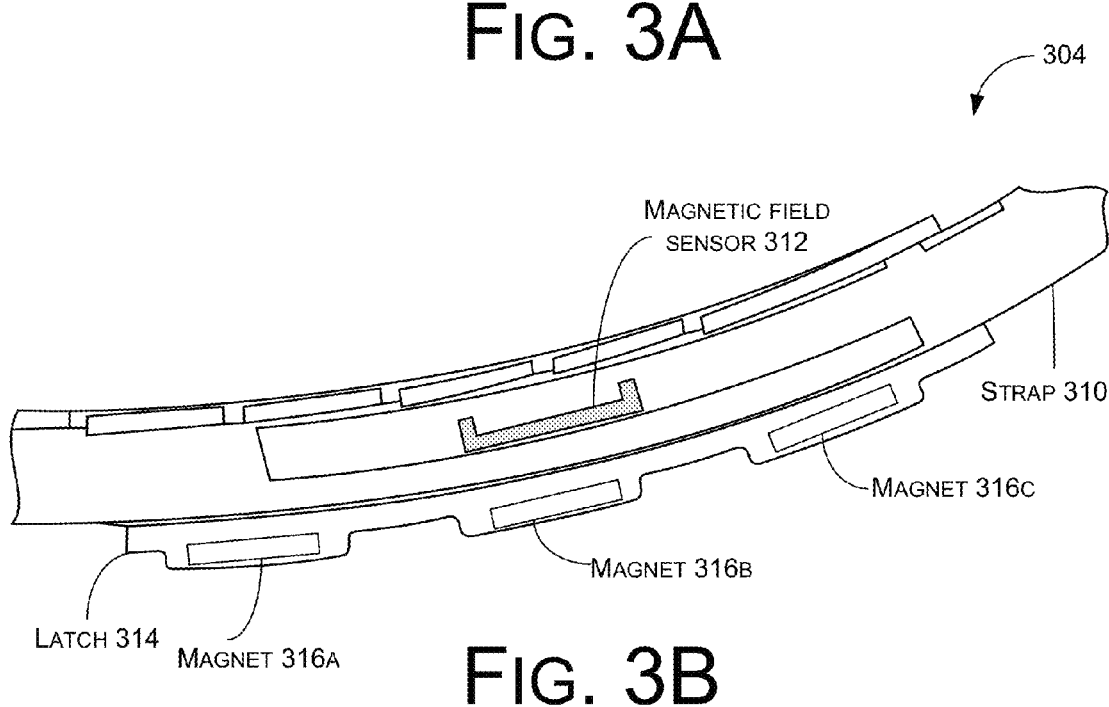

Although FIGS. 3A and 3B illustrates three magnets, the wearable device 304 may have any different number of magnets. For example, the number of magnets may be based on the number or span of the relative positions of the strap 310 and the latch 314. As an example, there may be a finite number of discrete possible relative positions between the latch 314 and the strap 310. In such a scenario, the number, shape and the position of the magnets in the latch 314 may be chosen such that for each discrete relative position of the strap 310 and the latch 314, at least one of the magnets is over or proximate to the magnetic field sensor 312 (i.e., magnetic field generated by at least one of the magnets is over the magnetic field sensor 312).

Thus, in some examples, the magnetic field sensor 312 may be over or proximate to a magnetic field generated by a corresponding magnet for a corresponding relative position of the strap 310 and the latch 314, e.g., when the wearable device 304 is in the closed position. For example, in FIG. 3B, the magnetic field sensor 312 is over or proximate to a magnetic field generated by the magnet 316b. However, if the user 102, for example, is re-adjusting a tightness of the wearable device 304, the magnetic field sensor 312 may slid over from one magnetic field to another (e.g., slid from being over the magnet 316b to being over the magnet 316a). Thus, for a brief period of time, the magnetic field sensor 312 may not sense a magnetic field (or sense a weak magnetic field). In some example, the authentication module 114 may be configured such that the wearable device 304 is de-authenticated if the magnetic field sensor 312 does not sense a magnetic field (or sense a weak magnetic field) even if for a brief period of time—in such examples, the wearable device 304 may be de-authenticated while the user 102, for example, tightens or loosens the wearable device 304, after the wearable device 304 has been authenticated. In some other examples, the authentication module 114 may be configured such that the wearable device 304 remains authenticated even if the magnetic field sensor 312 does not sense a magnetic field (or sense a weak magnetic field) for a brief period of time (e.g., for less than a threshold period of time)—in such examples, the wearable device 304 may remain authenticated while the user 102, for example, tightens or loosens the wearable device 304, after the wearable device 304 has been authenticated.

In the example of FIGS. 3A and 3B, while the wearable device 304 is in the open position, the magnet 316a may be relatively near to the magnetic field sensor 312, compared to the magnets 316b and 316c (e.g., due to an angular position of the latch 314 relative to the strap 310). Thus, even when the wearable device 304 is in the open position, the magnet 316a may generate a magnetic field that may be in part sensed by the magnetic field sensor 312 (e.g., thereby increasing a probability of the authentication module 114 mistakenly assuming that wearable device 304 is in the closed state). To mitigate the impact of the magnet 316a on the magnetic field sensor 312 while in the open state, in some examples, the magnet 316a may be a relatively weak or smaller magnet, e.g., compared to the strength and/or size of the magnets 316b and/or 316c. In such examples, if the wearable device 304 is in the closed state and the magnet 316a is over the magnetic field sensor 312, the magnet 316a being a relatively weak magnet, the magnetic field sensed by the magnetic field sensor 312 may be relatively weak. Accordingly, the sense signal 116 output by the magnetic field sensor 312 may be relatively weak, which may prompt the authentication module 114 to mistakenly assume that wearable device 304 is in the open state. To prevent such mistaken assumptions, in some examples, the threshold magnetic field for de-authenticating the wearable device 304 may be adjusted (e.g., lowered), for a relative position of the strap 310 and the latch 314 that results in the magnetic field sensor 312 being over the magnet 316a.

Although FIGS. 2A, 2B, 3A and 3B illustrate a wearable device including a latch and a strap, the wearable device may include any other mechanism to open and close the wearable device. For example, although not illustrated in the figures, the wearable device may comprise two straps, with a buckle attached to a first strap and a plurality of holes included in a second strap. When the user 102 wears the wearable device, a pin of the buckle of the first strap may be inserted in one of the holes in the second strap. In such an arrangement, the magnet and the magnetic field sensor may be coupled to any appropriate position of the wearable device. For example, the magnetic field sensor may be coupled to the buckle and pin arrangement of the first strap, while a magnetic strip may be embedded in the second strap.

In some other examples, the wearable device may be a necklace, and the necklace may hang on a chain. The chain may be opened or closed using an attachment mechanism (e.g., a clasp), and the magnet and the magnetic field sensor may be coupled to any appropriate components of the attachment mechanism (e.g., such that the wearable device may be de-authenticated whenever the chain is opened, for removing from a neck of a user).

In some other examples, the wearable device may comprise a magnetic key that may be inserted in a hole or slot of the wearable device. The sensor may be coupled to, proximally located to or embedded within the slot. As long as the magnetic key is inserted in the slot, the wearable device may remain authenticated. However, whenever the user brings the magnetic key out of the slot, the wearable device may be de-authenticated. In some examples, the wearable device may be configured such that the magnetic key may be automatically inserted in the slot whenever the user wears the wearable device. In some other examples, the user may have to manually insert the magnetic key in the slot, prior to the user authenticating the wearable device.

Figure 4:
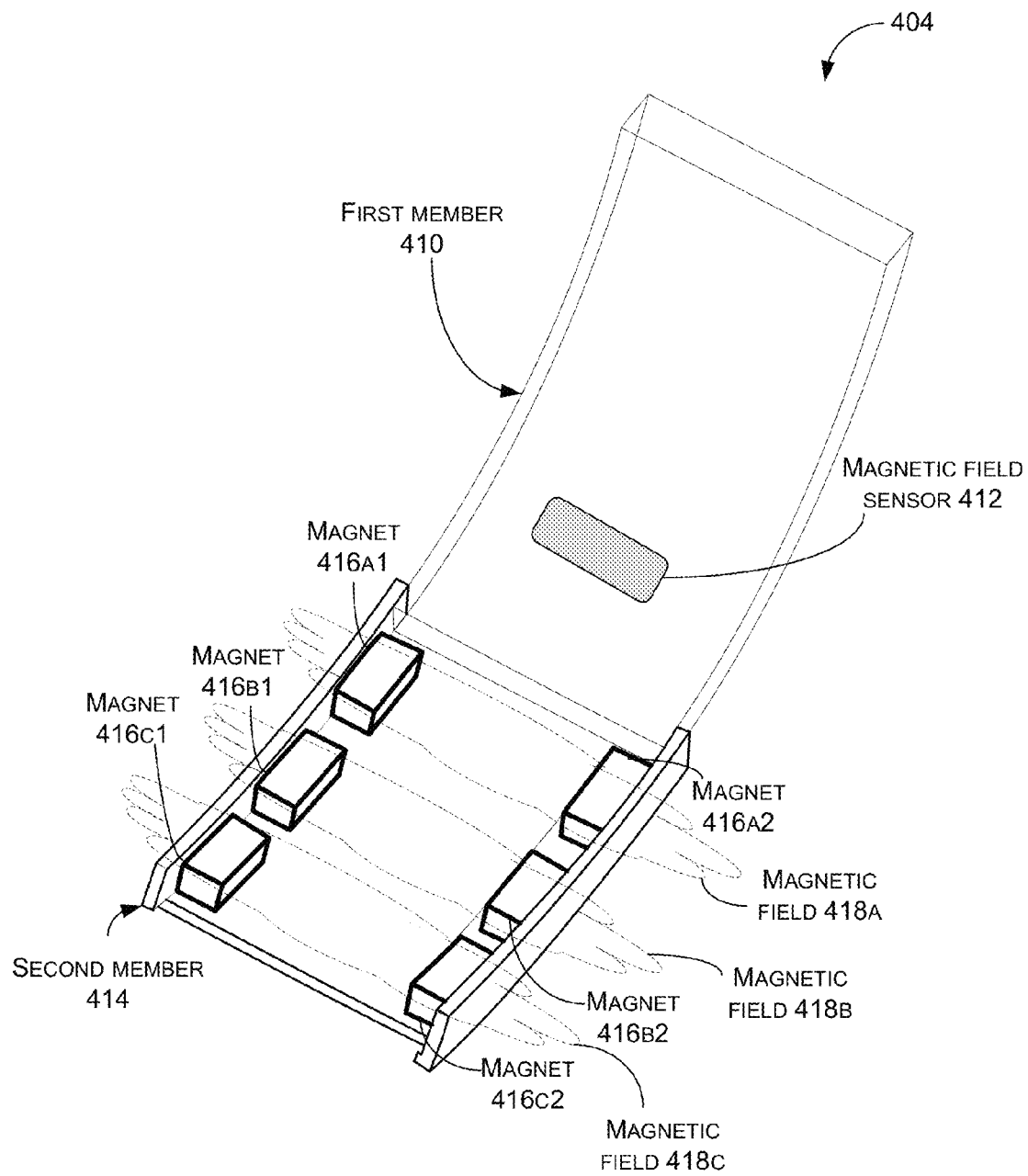
FIG. 4 illustrates a portion of another illustrative wearable device.

FIG. 4 illustrates a portion of an illustrative wearable device 404. Unlike the wearable devices 204 and 304 of FIGS. 2A-3B, the wearable device 404 does not include a strap and a latch. Instead, the wearable device 404 comprises a first member 410 and a second member 414, such that the first member 410 slides over the second member 414 when the user 102 wears the wearable device 404. An amount by which the first member 410 slides onto the second member 414 may be based on how tight the user 102 wants the wearable device 404 to be. For example, there may be a finite number of possible relative positions of the first member 410 and the second member 414, when the first member 410 slides onto the second member 414. Although not illustrated in FIG. 4 for purposes of illustrative clarity, the wearable device 404 may comprise an appropriate attaching mechanism by which the first member 410 may be attached or secured to the second member 414, after the user 102 has adjusted the tightness of the wearable device 404. For example, there may be multiple slots on each of the first member 410 and the second member 414, and a slot of the first member may be secured in a slot of the second member 414, thereby attaching the first member 410 and the second member 414.

In some examples, a magnetic field sensor 412 may be coupled to the first member 410. In some examples, a plurality of magnets 416a1, 416a2, 416b1, 416b2, 416c1 and 416c2 may be coupled to the second member 414. The magnets 416a1 and 416a2 may be aligned such that these magnets form a first pair of magnets, and create a first magnetic field 418a. Similarly, the magnets 416b1 and 416b2 may be aligned such that these magnets form a second pair of magnets, and create a second magnetic field 418b. Similarly, the magnets 416c1 and 416c2 may be aligned such that these magnets form a third pair of magnets, and create a third magnetic field 418c.

Although only three pairs of magnets are illustrated in FIG. 4, the second member 414 may include any different number of pairs of magnets (e.g., based on a distance by which the first member 410 slides onto the second member 414). Although not illustrated in FIG. 4, the wearable device 404 may include an authentication module, e.g., the authentication module 114 of FIG. 1.

In the example of FIG. 4, the first member 410 has not slid yet over the second member 414 (e.g., which corresponds to the open state of the wearable devices 204 and 304 of FIGS. 2A-3B), and the user 102 has not put on the wearable device 404. However, once the user 102 wears the wearable device 404, the magnetic field sensor 412 slides into at least one of the magnetic fields 418a, . . . , 418c (e.g., as the first member 410 slides into the second member 414).

The wearable device 404 may operate at least in part in a manner similar to the operation of the wearable devices 204 and 304. For example, after the user 102 wears the wearable device 404 and authenticates the wearable device 404, the authentication module 114 of the wearable device 404 may monitor a sense signal generated by the magnetic field sensor 412. The sense signal may be indicative of whether the magnetic field sensor 412 is aligned with, or can sense one or more of the magnetic fields 418a, . . . , 418c. If the sense signal indicates that the magnetic field sensor 412 is sensing a magnetic field, this indicates that the first member 410 is still slid into the second member 414, thereby implying that the user 102 is still wearing the wearable device 404.

However, if the user 102 removes the wearable device 404 (e.g., by sliding out the first member 410 from the second member 414, as illustrated in FIG. 4), the magnetic field sensor 412 may no longer be aligned or placed within a magnetic field. This change may be reflected in the sense signal, as sensed by the magnetic field sensor 412, and may be detected by the authentication module 114. Accordingly, the authentication module 114 may de-authenticate the wearable device 404, thereby deterring misuse of the wearable device 404 by an unauthorized user.

Thus, in some examples, the magnetic field sensor 412 may be over or proximate to a corresponding magnetic field for a corresponding relative position of the first member 410 and the second member 414, e.g., when the wearable device 404 is in the closed position. However, if the user 102, for example, is re-adjusting a tightness of the wearable device 404, the magnetic field sensor 412 may slid over from one magnetic field to another. Thus, for a brief period of time, the magnetic field sensor 412 may not sense a magnetic field (or sense a weak magnetic field). In some example, the authentication module 114 may be configured such that the wearable device 404 is de-authenticated if the magnetic field sensor 412 does not sense a magnetic field (or sense a weak magnetic field) even if for a brief period of time—in such examples, the wearable device 404 may be de-authenticated while the user, for example, tightens or loosens the wearable device 404, after the wearable device 404 has been authenticated. In some other examples, the authentication module 114 may be configured such that the wearable device 404 remains authenticated if the magnetic field sensor 412 does not sense a magnetic field (or sense a weak magnetic field) for a brief period of time (e.g., for less than a threshold period of time)—in such examples, the wearable device 404 may remain authenticated while the user, for example, tightens or loosens the wearable device 404, after the wearable device 404 has been authenticated.

Figure 5A:
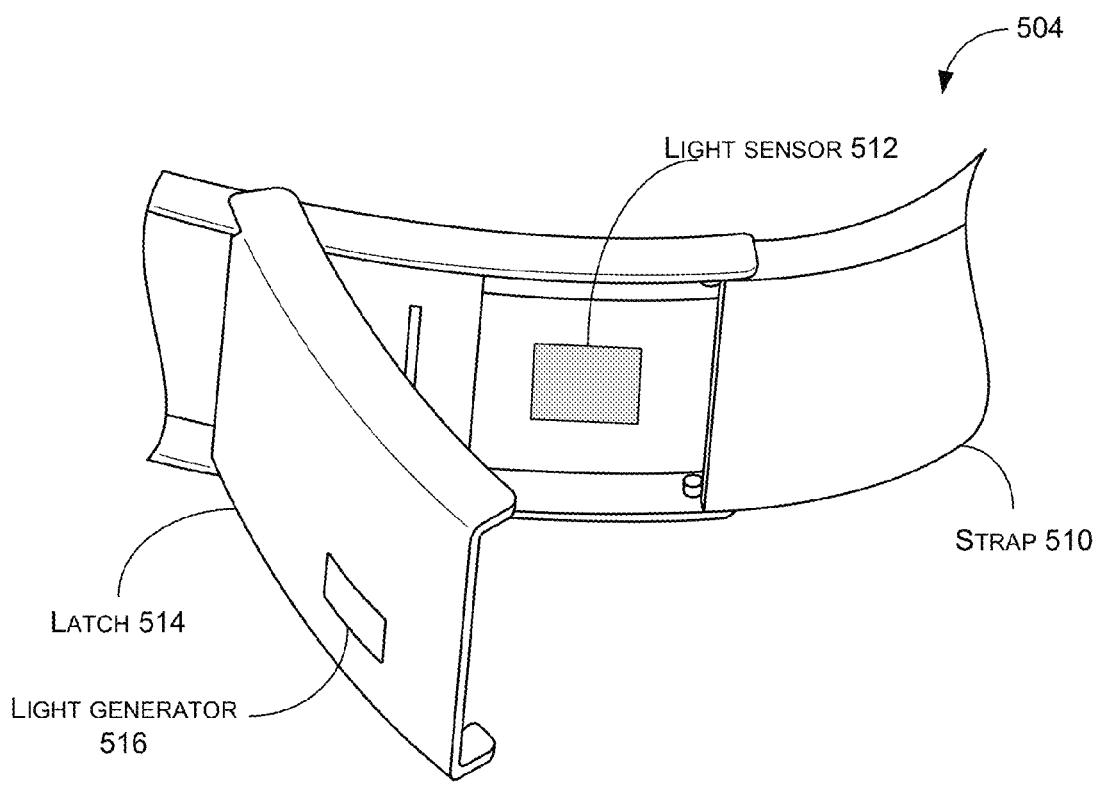
FIGS. 5A and 5B illustrate a portion of another illustrative wearable device.
Figure 5B:
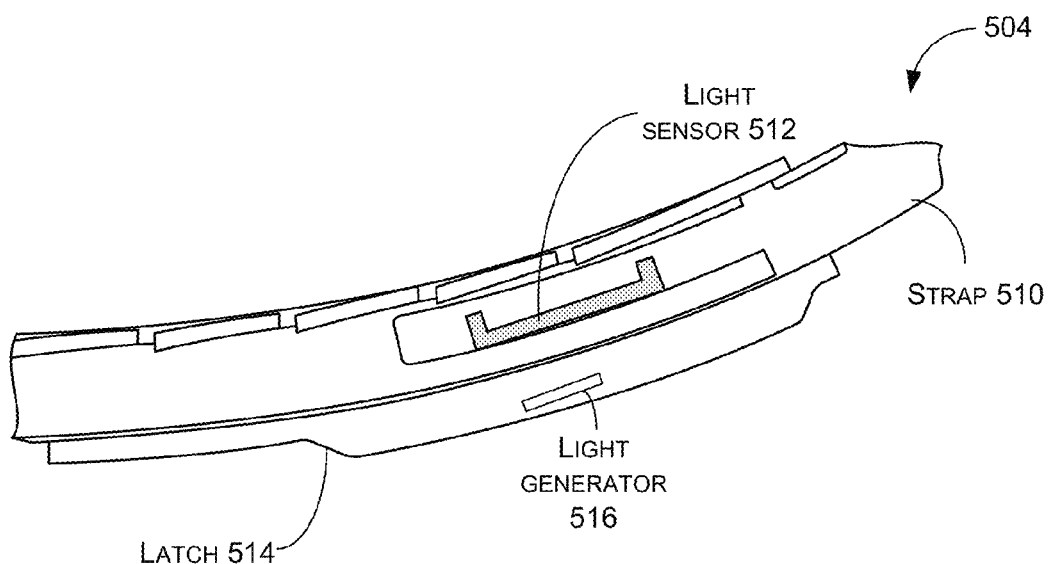

FIGS. 5A and 5B illustrate a portion of an illustrative wearable device 504. In FIGS. 2A-4, one or more magnets and a magnetic sensor are used to selectively de-authenticate a wearable device, if the user 102 removes the wearable device. However, in the examples of FIGS. 5A and 5B, a light generator 516 and a light sensor 512 are used to selectively de-authenticate the wearable device 504.

FIG. 5A illustrates the portion of the wearable device 504 while the wearable device 504 is in an open state; and FIG. 5B illustrates the portion of the wearable device 504 while the wearable device 504 is in a closed state. The wearable device 504, for example, is a wristband, a bracelet, a belt, an anklet, or the like.

The wearable device 504 may comprise a strap 510, the light sensor 512 coupled to the strap 510, a latch 514, and the light generator 516 coupled to the latch 514. Although not illustrated in FIGS. 5A and 5B, the position of the light sensor 512 and the light generator 516 may be interchanged.

In some examples, the light generator 516 may generate infrared (IR) light (although in some example, light generator 516 may generate visible light, or lights having any appropriate wave length), which may be sensed by the light sensor 512. Based on sensing the IR light, the light sensor 512 may generate a sense signal. In some examples, the sense signal may be indicative of one or more characteristics of the IR light sensed by the light sensor 512 (e.g., an intensity of the IR light, an amplitude of the IR light, a code transmitted via the IR light, etc.), thereby also being indicative of a distance between the light generator 516 and the light sensor 512. In some examples, the wearable device 504 may also comprise an authentication module, e.g., the authentication module 114 of FIG. 1.

The wearable device 504 may operate at least in part similar to the operation of the wearable device 204. For example, after the user 102 wears the wearable device 504 and authenticates the wearable device 504, the authentication module 114 of the wearable device 504 may monitor the sense signal generated by the light sensor 512. The sense signal may be indicative of an intensity or amplitude of the IR light sensed by the light sensor 512, thereby also being indicative of the distance between the light generator 516 and the light sensor 512. If the sense signal indicates a high intensity or high amplitude (e.g., higher than a threshold intensity) of the sensed IR light, this may indicate that the distance between the light generator 516 and the light sensor 512 is below a threshold distance and that the wearable device 504 is in the closed state (i.e., still being worn by the user 102). Accordingly, the authentication module 114 may continue keeping the wearable device 504 authenticated.

However, if the user 102 removes the wearable device 504 (e.g., by separating the latch 516 from the strap 510, as illustrated in FIG. 5A), the sense signal may indicate a low intensity or low amplitude (e.g., lower than the threshold intensity) of the sensed IR light, thereby indicating that the distance between the light generator 516 and the light sensor 512 may be above the threshold distance. Accordingly, the authentication module 114 may de-authenticate the wearable device 504, thereby deterring misuse of the wearable device 504 by an unauthorized user.

In some examples, to avoid the light sensor 512 from sensing IR light generated by an external light generator (e.g., that is external to the wearable device 504), a code or frequency of the IR light generated by the light generator 514 may be periodically varied. For example, the code or the frequency of the IR light generated by the light generator 514 may be varied periodically in a pseudo-random or predetermined sequence, which may be known to the light sensor 512 (or a processing circuit coupled to the light sensor)—but not known to an unauthorized user of the wearable device 504. For example, during a first period of time, the light generator 516 may use a first code or a first frequency to generate the IR light, where the first code or the first frequency may be known to the light sensor 512. During the first period of time, the light sensor 512 may sense the IR light having the first code or the first frequency. However, if, during the first period of time, an external light generator generates IR light with a second code or second frequency, such IR light from the external light generator may be rejected by the light sensor 512. It may be highly unlikely for the external light generator to generate IR light with the first code or the first frequency, as the first code or the first frequency may not be known to the external light generator. This may prevent the external light generator from trying to continue keeping the wearable device 504 authenticated, even if the user 102 removes the wearable device 504 from his or her body.

Although FIGS. 5A and 5B specifically illustrate a light generator and a light sensor, the generator 516 may, instead of generating light, generate, for example, an electromagnetic pulse. Such a pulse may be sensed by the sensor 512, and an intensity of the pulse, as sensed by the sensor 512, may be used to estimate a distance between the generator 516 and the sensor 512, which may in turn be used to selectively de-authenticate the wearable device 504 (e.g., if the user 102 removes the wearable device 504 from his or her body).

Figure 6A:
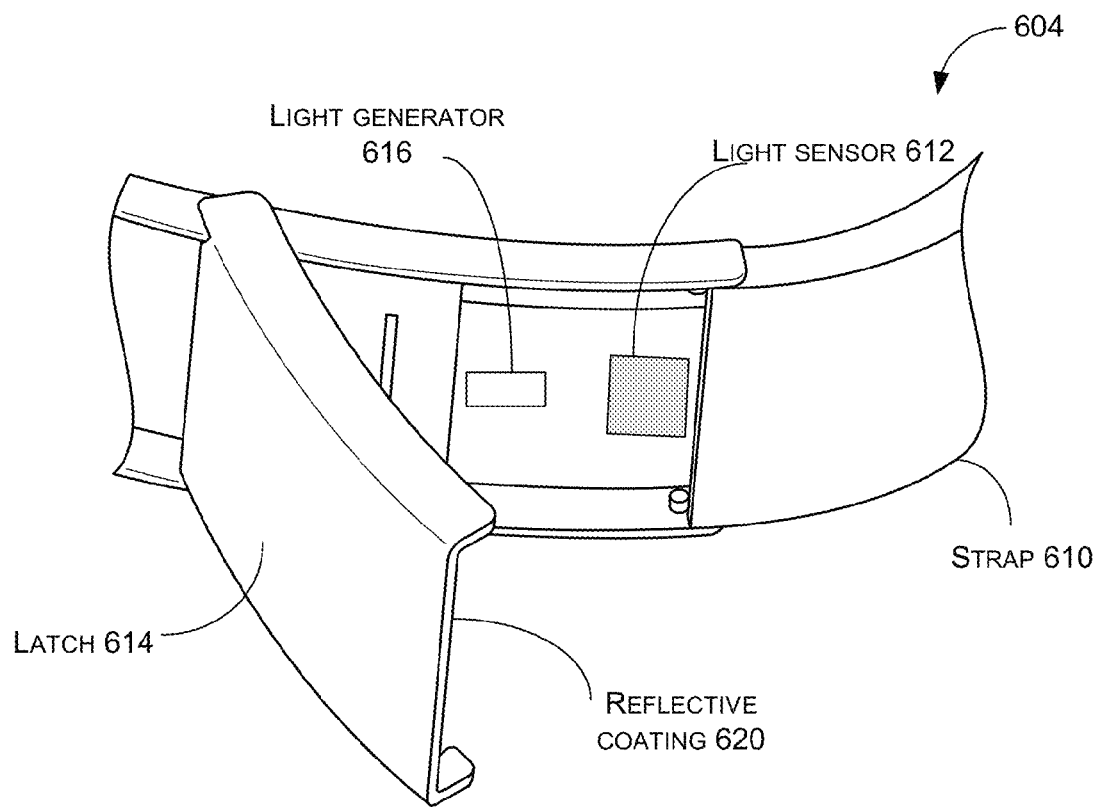
FIGS. 6A and 6B illustrate a portion of another illustrative wearable device.
Figure 6B:
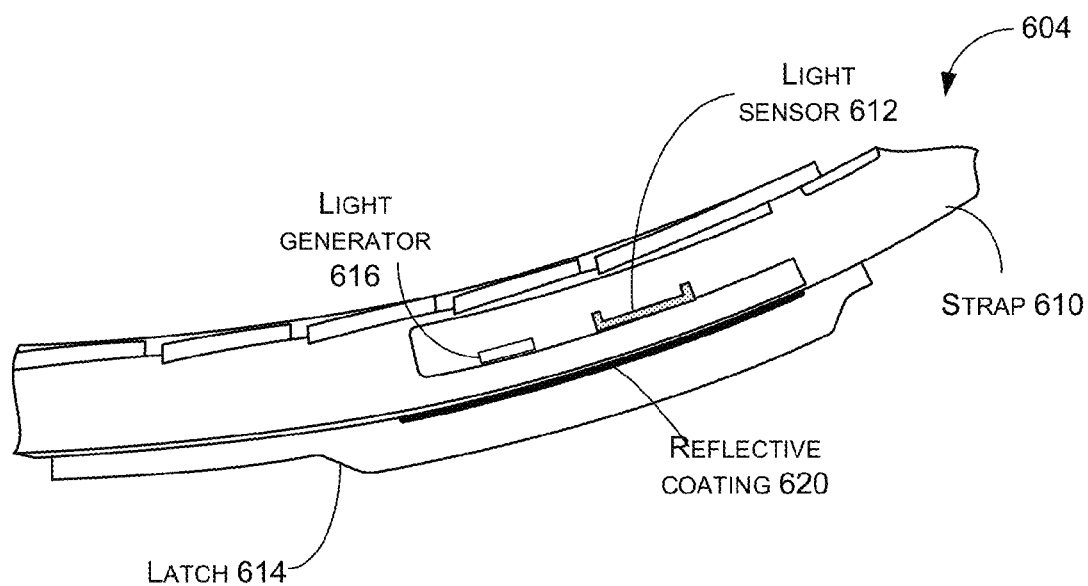

FIGS. 6A and 6B illustrate a portion of an illustrative wearable device 604. Similar to FIGS. 5A and 5B, in FIGS. 6A-6B, the wearable device 604 comprises a light generator 616 and a light sensor 612 to selectively de-authenticate the wearable device 604. However, unlike FIGS. 5A and 5B, in FIGS. 6A and 6B, the light generator 616 and the light sensor 612 may both be disposed on a strap 610 of the wearable device 604. In some examples, a reflective coating 620 may be disposed on an inner surface area of a latch 614 of the wearable device 604 (e.g., the inner surface area of the latch 614 may be painted with the reflective coating 620). The reflective coating 620 may comprise, for example, a coating of an appropriate color, which can reflect IR light. FIG. 6A illustrates the portion of the wearable device 604 while the wearable device 604 is in an open state; and FIG. 6B illustrates the portion of the wearable device 604 while the wearable device 604 is in a closed state. The wearable device 604, for example, is a wristband, a bracelet, a belt, an anklet, or the like.

Although FIGS. 6A and 6B illustrate both the light generator 616 and the light sensor 612 being disposed on the strap 610 of the wearable device 604, in some other examples and although not illustrated in the figures, both the light generator 616 and the light sensor 612 may be disposed on the latch 614 of the wearable device 604 (e.g., instead of being disposed on the strap 610), and the reflective coating 620 may be disposed on the strap 610.

When the wearable device 604 is in the closed state (e.g., as illustrated in FIG. 6B), light generated by the light generator 616 may be reflected by the reflective coating 620 and sensed by the light sensor 612. When the wearable device 604 is in the open state, light generated by the light generator 616 may be reflected by the reflective coating 620 in a direction that is different from the direction of the light sensor 612 (e.g., as illustrated in FIG. 6A). Accordingly, when the wearable device 604 is in the open state, an amplitude or intensity of the light sensed by the light sensor 612 may be less compared to the amplitude or intensity of the light sensed by the light sensor 612 when the wearable device 604 is in the closed state. The sense signal generated by the light sensor 612 may be indicative of the intensity or the amplitude of light sensed by the light sensor 612, which may be indicative of whether the wearable device 604 is in a closed state or an open state. Such sensing may be used to selectively de-activate the wearable device 604, e.g., as discussed with respect to FIGS. 5A and 5B.

Figure 7A:
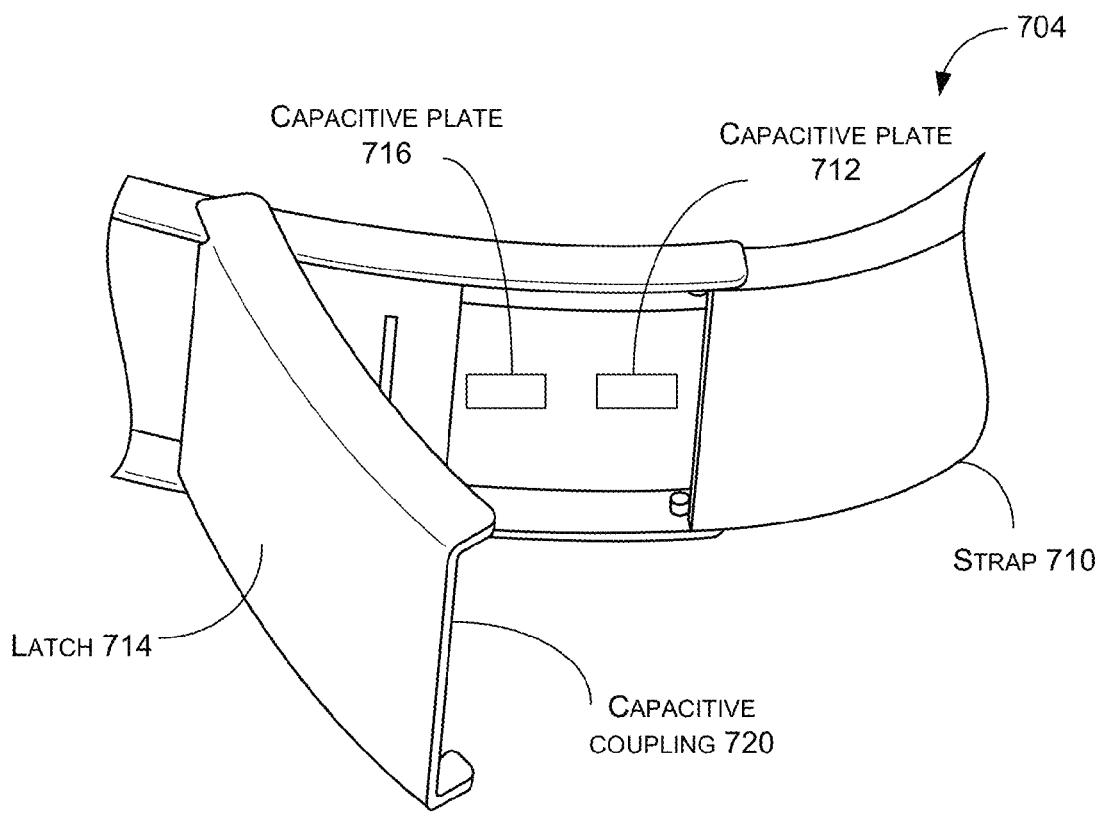
FIGS. 7A and 7B illustrate a portion of another illustrative wearable device.
Figure 7B:
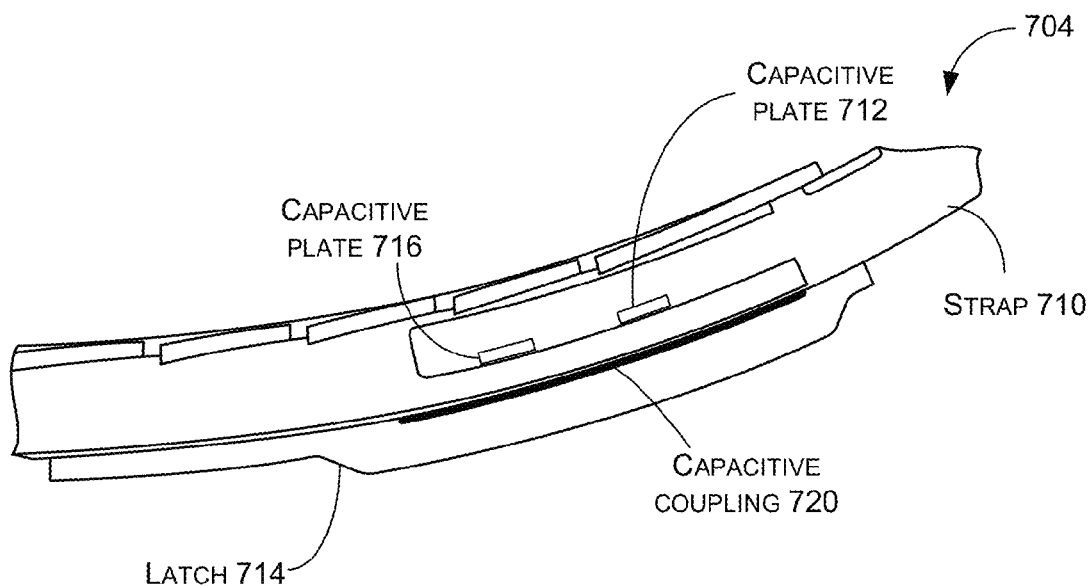

In FIGS. 2A-4, one or more magnets and a magnetic sensor are used to selectively de-authenticate a wearable device, if the user 102 removes the wearable device. In FIGS. 5A-6B, a light generator and a light sensor are used to selectively de-authenticate a wearable device, if the user 102 removes the wearable device. However, any other appropriate sense mechanism may be used to selectively de-authenticate a wearable device, if the user 102 removes the wearable device. In some examples, a capacitive arrangement may be used to selectively de-authenticate a wearable device. For example, FIGS. 7A and 7B illustrate a portion of an illustrative wearable device 704. In FIGS. 7A-7B, the wearable device 704 comprises capacitive plates 712 and 716 disposed on a strap 710 of the wearable device 704, and a capacitive coupling 720 disposed on an inner surface of the latch 714. The capacitive coupling 720 may comprise a metal layer or a metal plate.

A voltage (e.g., using a battery of the wearable device) may be applied across the capacitive plate 712 and the capacitive plate 716, and a capacitance between the first capacitive plate and the second capacitive plate may be measured. When the wearable device 704 is in the closed state (e.g., as illustrated in FIG. 7B), the capacitive coupling 720 may be located proximally over the capacitive plates 712 and 716. Accordingly, a capacitive path via the capacitive plate 712, the capacitive coupling 720, and the capacitive plate 716 may be completed. However, when the wearable device 704 is in the open state (e.g., as illustrated in FIG. 7A), the capacitive coupling 720 may not be located proximally over the capacitive plates 712 and 716, and accordingly, no capacitive path may be formed via the capacitive plate 712, the capacitive coupling 720, and the capacitive plate 716.

Thus, a capacitance measured between the capacitive plates 712 and 716 may provide an indication of whether the wearable device 704 is in an open state or a closed state, based on whether the capacitive coupling 720 capacitively couples the capacitive plates 712 and 716. Such a measurement of the capacitance may be used to selectively de-authenticate the wearable device 704, e.g., as discussed with respect to FIGS. 2A and 2B.

Although FIGS. 7A and 7B illustrate the capacitive plates 712 and 716 being disposed on the strap 710 and the capacitive coupling 720 being disposed on the latch 714, in some other examples and although not illustrated in the figures, the capacitive plates 712 and 716 may be disposed on the latch 714, and the capacitive coupling 720 may be disposed on the strap 710.

Although FIGS. 7A and 7B illustrate the capacitive plates 712 and 716 being disposed on the strap 710, in some other examples and although not illustrated in the figures, the capacitive plates 712 and 716 may be disposed on the latch 714 and the strap 710, respectively. In such examples, the wearable device may not include the capacitive coupling 720, and the capacitance between the capacitive plates 712 and 716 may be based on proximity of capacitive plates 712 and 716, which may in turn be based on whether the wearable device 704 is in the open state or the closed state. Such a measurement of the capacitance may be used to selectively de-authenticate the wearable device, e.g., as discussed with respect to FIGS. 2A and 2B.

Figure 8A:
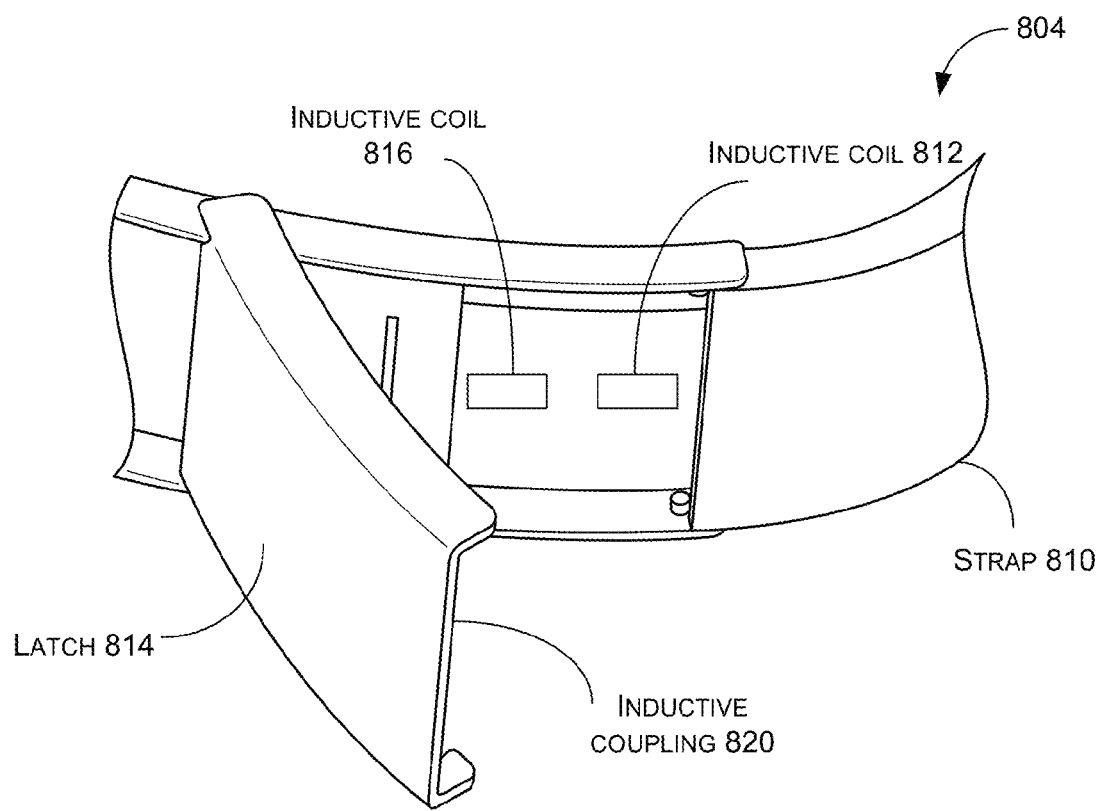
FIGS. 8A and 8B illustrate a portion of another illustrative wearable device.
Figure 8B:
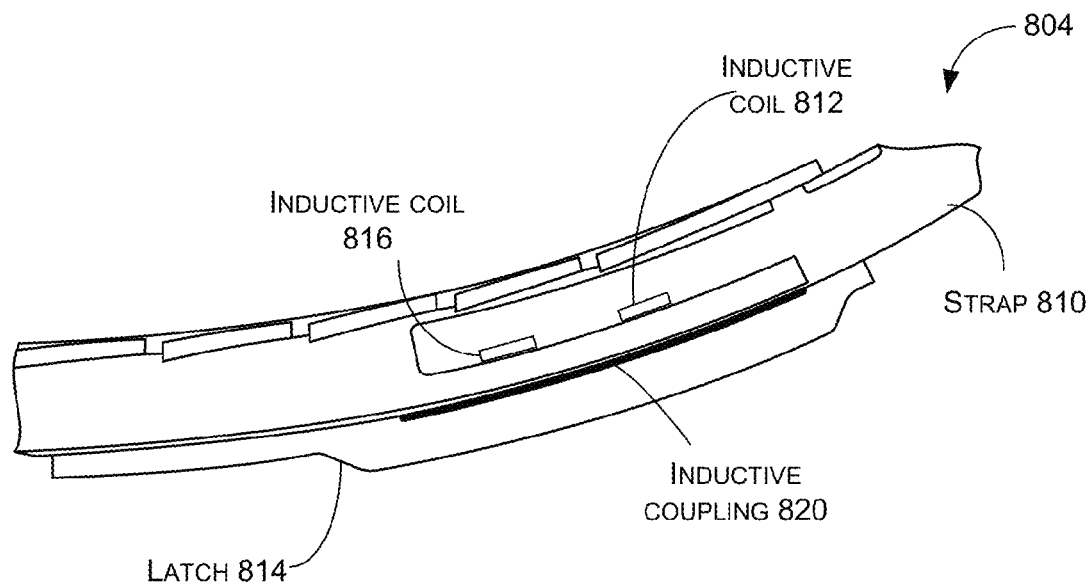

FIGS. 8A and 8B illustrate a portion of an illustrative wearable device 804. FIGS. 8A and 8B are similar to FIGS. 7A and 7B. For example, the wearable device 804 comprises a strap 810 and a latch 814. However, unlike the wearable device 704 in which a capacitive coupling is illustrated, the wearable device 804 of FIGS. 8A and 8B may use an inductive coupling to selectively de-authenticate the wearable device 804.

In FIGS. 8A-8B, the wearable device 804 comprises inductive coils 812 and 816 disposed on the strap 810 of the wearable device 804, and an inductive coupling 820 disposed on an inner surface of the latch 814. The inductive coupling 820 may comprise a metal layer or a metal plate.

A voltage (e.g., using a battery of the wearable device) may be applied across the inductive coils 812 and 816, and an inductance between the inductive coils 812 and 816 may be measured. When the wearable device 804 is in the closed state (e.g., as illustrated in FIG. 8B), the inductive coupling 820 may be located proximally over the inductive coils 812 and 816. Accordingly, an inductive path via the inductive coil 812, the inductive coupling 820, and the inductive coil 816 may be completed. However, when the wearable device 804 is in the open state (e.g., as illustrated in FIG. 8A), the inductive coupling 820 may not be located proximally over the inductive coils 812 and 816, and accordingly, no inductive path may be formed.

Thus, an inductance measured between the inductive coils 812 and 816 may provide an indication of whether the wearable device 804 is in an open state or a closed state, based on whether the inductive coupling 820 inductively couples the inductive coils 812 and 816. Such a measurement of the inductance may be used to selectively de-authenticate the wearable device 804, e.g., as discussed with respect to FIGS. 2A and 2B.

Although FIGS. 8A and 8B illustrate the inductive coils 812 and 816 being disposed on the strap 810 and the inductive coupling 820 being disposed on the latch 814, in some other examples and although not illustrated in the figures, the inductive coils 812 and 816 may be disposed on the latch 814, and the inductive coupling 820 may be disposed on the strap 810.

Although FIGS. 8A and 8B illustrates the inductive coils 812 and 816 being disposed on the strap 810, in some other examples and although not illustrated in the figures, the inductive coils 812 and 816 may be disposed on the latch 814 and the strap 810, respectively. In such examples, the wearable device may not include the inductive coupling 820. The inductance between the inductive coils 812 and 816 may be based on proximity of the inductive coils 812 and 816, which may in turn be based on whether the wearable device 804 is in the open state or closed state. Such a measurement of the inductance may be used to selectively de-activate the wearable device, e.g., as discussed with respect to FIGS. 2A and 2B.

Operation

Figure 9:
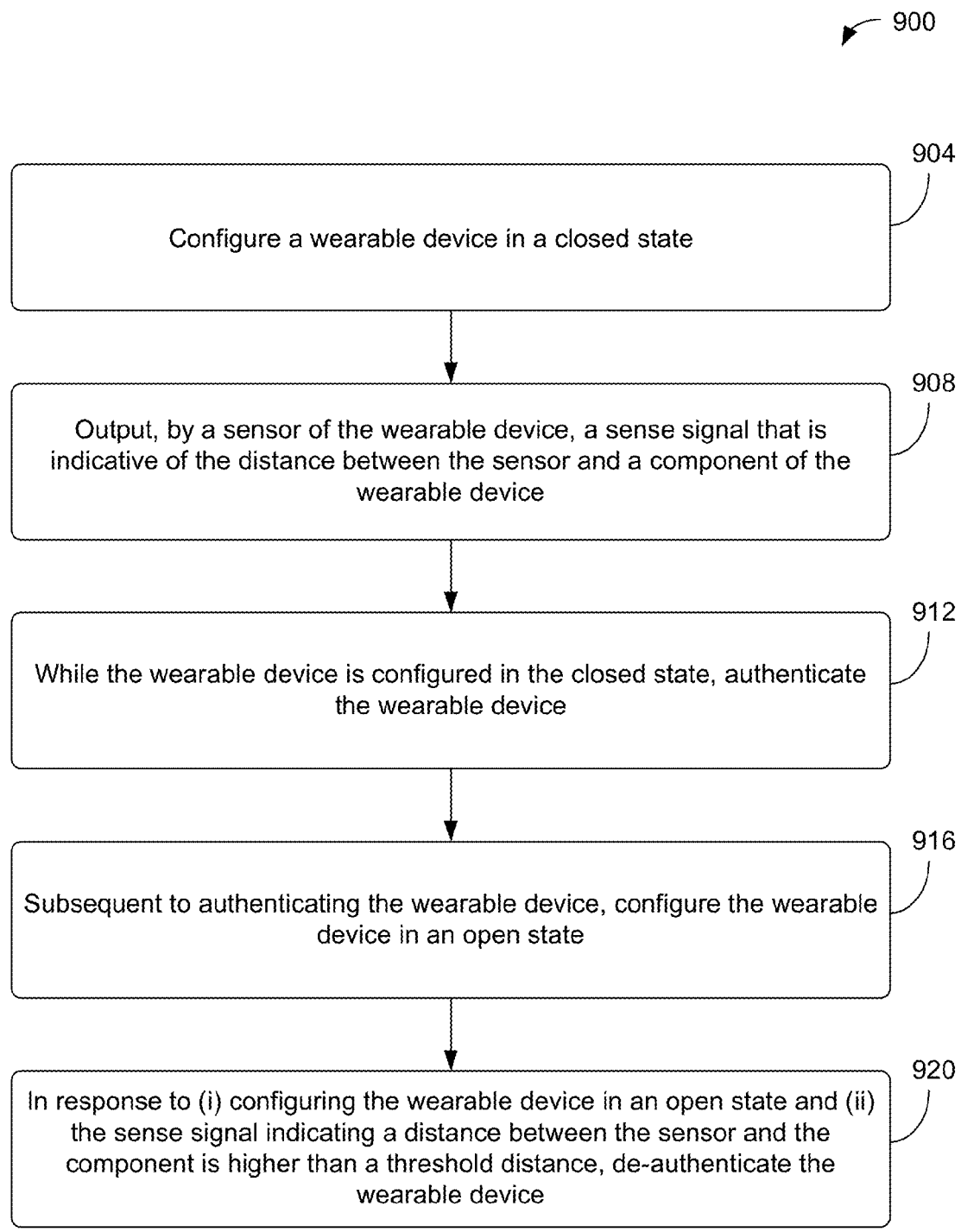
FIG. 9 illustrates an example process for selectively de-authenticating a wearable device.

FIG. 9 illustrates process 900 for selectively de-authenticating a wearable device. The process 900 is illustrated as a collection of blocks in a logical flow graph, which represent a sequence of operations which may be implemented in hardware, software, or a combination thereof. In the context of software, the blocks represent computer-executable instructions which, when executed by one or more processors, perform the recited operations. Generally, computer-executable instructions include routines, programs, objects, components, data structures, and the like to perform particular functions or implement particular abstract data types. These instructions may be embodied as computer readable program code stored on a computer-readable medium. This computer readable medium may include, but is not limited to, non-transitory computer readable media such as random access memory (RAM), read only memory (ROM), Electrically Erasable Programmable Read-Only Memory (EEPROM), flash memory or other memory technology, compact disks (CD), digital versatile disks (DVD) or other optical storage, magnetic cassettes, magnetic tape, magnetic disk storage or other magnetic storage devices, redundant array of independent disks (RAID) storage systems, or any other medium which may be used to store the desired information and which may be accessed by a computing device. In addition, the order in which the operations of the processes are described is not intended to be construed as a limitation, and any number of the described blocks may be combined in any order and/or in parallel to implement the process.

Process 900 includes operation 904, in which a wearable device (e.g., wearable devices 104, 204, 304, 404 or 504) may be configured in a closed state. In some examples, the wearable device may comprise (i) a first member (e.g., first member 106 of FIG. 1), (ii) a second member (e.g., second member 110) that is configured to move relative to the first member, (iii) a sensor (e.g., sensor 108) disposed on the first member, and (iv) a component (e.g., component 112) disposed on the second member. In some examples, while the wearable device is configured in the closed state, a distance between the sensor and the component may be less than a threshold distance. In some examples, the sensor comprises a magnetic field sensor and the component comprises one or more magnets. In some examples, the sensor comprises a light sensor and the component comprises a light generator generating IR light.

Process 900 further includes operation 908, in which the sensor outputs a sense signal (e.g., sense signal 116 of FIG. 1). The sense signal may be indicative of the distance between the sensor and the component. The sense signal may indicate an actual distance, or simply whether the component is within a threshold distance from the sensor.

Process 900 further includes operation 912, in which the wearable device may be authenticated, while the wearable device is configured in the closed state. In some examples, the wearable device may be authenticated in response to receiving, from a user, a password or a finger print of the user.

Process 900 further includes operation 916, in which subsequent to authenticating the wearable device, the wearable device may be configured in an open state (e.g., when removed from a body of the user, and/or while at least a part of the first member is separated from the second member). While the wearable device is configured in the open state, the distance between the sensor and the component may be higher than the threshold distance.

Process 900 further includes operation 916, in which in response to (i) configuring the wearable device in an open state and (ii) the sense signal indicating the distance between the sensor and the component is higher than the threshold distance, the wearable device may be de-authenticated, e.g., to deter misuse of the wearable device by an unauthorized user.

CONCLUSION

Various example components, configurations, acts, operations, etc. described herein may be used separately or in conjunction with each other. Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   detecting, by a wearable device, that the wearable device is in a first state;
   receiving an authentication credential by the wearable device, while the wearable device is in the first state;
   transitioning, by the wearable device, to an authenticated state based at least in part on the authentication credential;
   subsequent to transitioning to the authenticated state, generating light by a light generator disposed on a first member of the wearable device;
   reflecting, by a reflective coating disposed on a second member of the wearable device and towards a light sensor disposed on the first member, at least a portion of the light generated by the light generator;
   sensing, by the light sensor, at least a portion of the light being reflected towards the light sensor;
   based at least in part on the sensing, outputting, by the light sensor, a signal that is indicative of whether the wearable device is in the first state or a second state;
   based at least in part on the signal, detecting that the wearable device is in the second state; and
   in response to detecting that the wearable device in the second state, transitioning, by the wearable device, to a de-authenticated state.

2. The method of claim 1, wherein the second member is configured to move relative to the first member.

3. The method of claim 1, further comprising:
   transitioning, by the wearable device, to the first state based at least in part on the first member being attached to the second member and the wearable device being worn by a user; and
   transitioning, by the wearable device, to the second state based at least in part on the first member being opened from the second member.

4. The method of claim 1, wherein:
   the light sensor is configured to output the signal that is indicative of a characteristic of light generated by the light generator, as sensed by the light sensor; and
   the characteristic of the light, as sensed by the light sensor, is indicative of whether the wearable device is in the first state or the second state.

5. The method of claim 4, further comprising:
   varying a code associated with the light generated by the light generator over time.

6. The method of claim 1, wherein transitioning to the de-authenticated state comprises:
   in response to detecting that the wearable device in the second state, automatically transitioning to the de-authenticated state, without receiving an input from a user to transition to the de-authenticated state.

7. A wearable device comprising:
   a first member;
   a second member that is configured to move relative to the first member;
   a light sensor disposed on the first member;
   a light generator disposed on the first member, wherein the second member comprises a reflective coating, and wherein while the wearable device is in a first state, the reflective coating is configured to receive light generated by the light generator and reflect at least a portion of the light towards the light sensor; and
   an authentication module configured to:
      detect that the wearable device is in the first state,
      while the wearable device is detected to be in the first state, receive an authentication credential,
      cause transition of the wearable device to an authenticated state based at least in part on the authentication credential,
      subsequent to authenticating the wearable device, detect that the wearable device is in a second state, and
      in response to detecting that the wearable device in the second state, cause transition the wearable device to a de-authenticated state.

8. The wearable device of claim 7, wherein:
   the light sensor is configured to output a signal that is indicative of a relative position of the first member with respect to the second member; and
   the authentication module is further configured to detect whether the wearable device is in the first state or the second state, based at least in part on the signal output by the sensor.

9. The wearable device of claim 7, wherein:
   the light sensor is configured to output a signal that is indicative of whether the wearable device is in the first state or the second state; and
   the authentication module is further configured to detect whether the wearable device is in the first state or the second state, based at least in part on the signal output by the light sensor.

10. The wearable device of claim 9, wherein:
    the light sensor is configured to output the signal that is indicative of a characteristic of light generated by the light generator, as sensed by the light sensor; and
    the characteristic of the light, as sensed by the light sensor, is indicative of whether the wearable device is in the first state or the second state.

11. The wearable device of claim 7, wherein the authentication module is configured to cause of transition of the wearable device to the de-authenticated state by:

in response to detecting that the wearable device in the second state, automatically causing transition the wearable device to the de-authenticated state, without receiving an input from a user to cause the transition.

* * * * *